United States Patent [19]
Ruiz

[11] 3,766,716
[45] Oct. 23, 1973

[54] ANTI-POLLUTION AND HYDROMOGENIZATION

[76] Inventor: Rene A. Ruiz, 8100 Lenore Dr., Houston, Tex. 77017

[22] Filed: Aug. 30, 1971

[21] Appl. No.: 175,965

[52] U.S. Cl. ...................... 55/223, 55/233, 55/256, 55/316, 55/387, 55/DIG. 20, 110/119, 261/98, 261/113, 261/124, 261/126, 261/DIG. 9

[51] Int. Cl. ........................................... B01d 47/02

[58] Field of Search ..................... 55/223, 233, 240, 55/255, 256, 387, 244, 260, 316, DIG. 20; 261/126, 124, 113, 98, DIG. 9; 110/119

[56] References Cited
UNITED STATES PATENTS

| | | | |
|---|---|---|---|
| 3,537,239 | 11/1970 | Dunmire | 55/260 X |
| 3,642,259 | 2/1972 | Bowden | 55/259 X |
| 2,523,441 | 9/1950 | McKamy | 55/223 X |
| 3,593,499 | 7/1971 | Kile | 55/387 X |
| 1,237,571 | 8/1917 | Stewart | 261/DIG. 9 X |
| 3,572,264 | 3/1971 | Mercer | 261/DIG. 9 X |
| 2,612,745 | 10/1952 | Vecchio | 55/256 X |
| 1,404,998 | 1/1922 | Pappanikolaou | 261/126 |
| 3,553,943 | 1/1971 | Sharpe | 55/223 |

*Primary Examiner*—Frank W. Lutter
*Assistant Examiner*—William Cuchlinski, Jr.

[57] ABSTRACT

Apparatus for removing particles from smoke has a preliminary filter unit including perforate plates with charcoal lumps thereon, liquid spray jets, a cap for deflecting smoke past the spray and through the filter unit, a tank including liquid maintained at a level sufficient to submerge the lower ends of the filter walls therein whereby the smoke passes directly from the filter through the liquid for discharge to the atmosphere.

3 Claims, 7 Drawing Figures

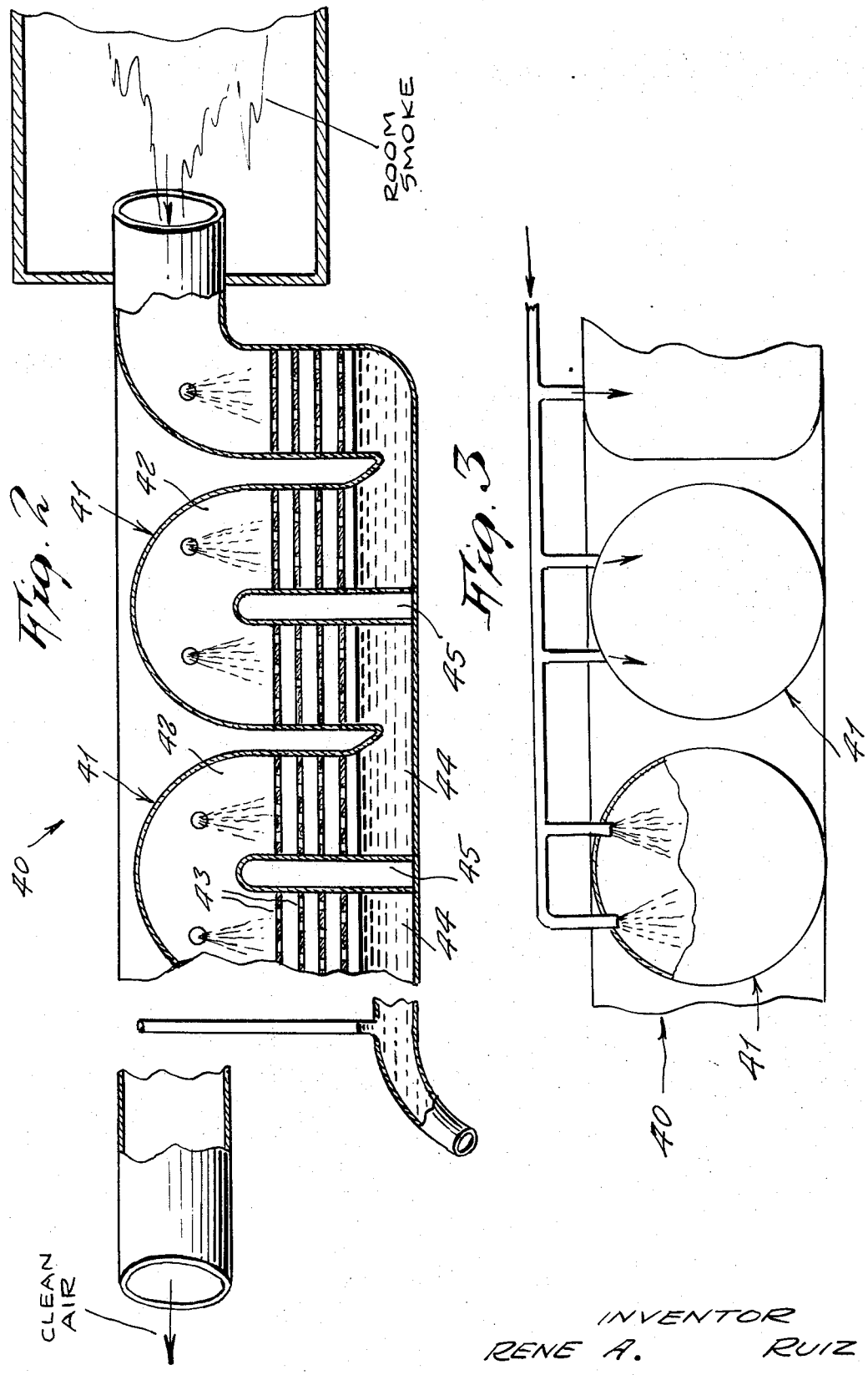

INVENTOR
RENE A. RUIZ

ANTI-POLLUTION AND HYDROMOGENIZATION

This invention relates generally to anti-air pollution devices.

A principle object of the present invention is to provide an anti pollution device which purifies a smoke from a chimney of a building or a smoke stack of an industrial plant.

Another object is to provide an anti-pollution device which is practically 100 percent efficient in the removal of solids, gases and liquids of harmful nature from a smoke, so that only pure air is discharged into the atmosphere, while the objectionable matter is collected therefrom.

Another object is to provide an anti-pollution device which takes up only a small amount of space so that it can be installed along any part of a smokestack or chimney.

Other objects are to provide an anti-pollution apparatus which is simple in design, inexpensive to manufacture, rugged in construction, easy to use, and efficient in operation.

These and other objects will be readily apparent upon a study of the following specification and the accompanying drawings wherein:

FIG. 2 is a side cross sectional view of a modified design of the invention, and which is adapted for an installation of a room of a house.

FIG. 3 is a fragmetary top plan view of the structure shown in FIG. 2.

Figure 1:
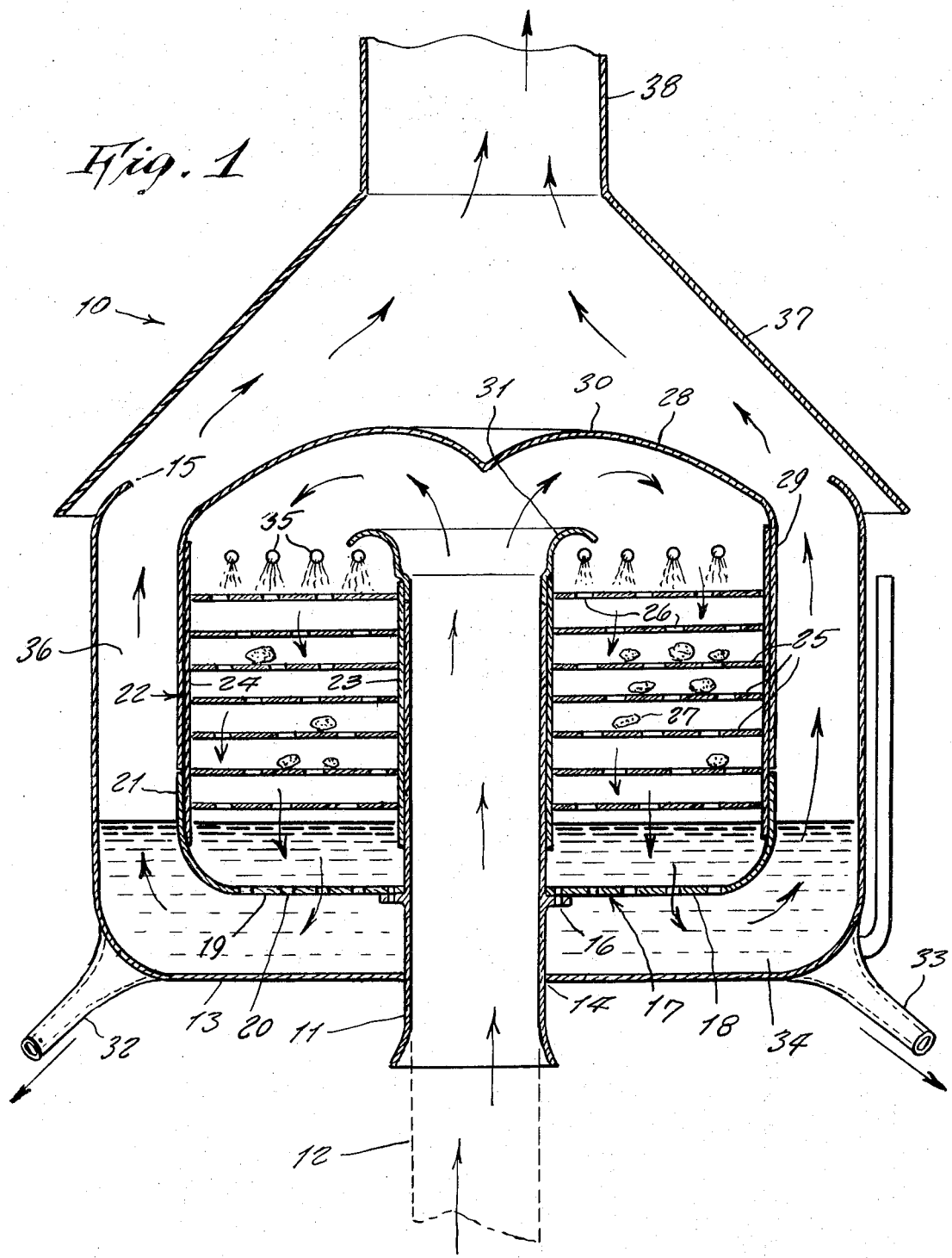
FIG. 1 is a side cross sectional view showing one form of the present invention.
Figure 4:
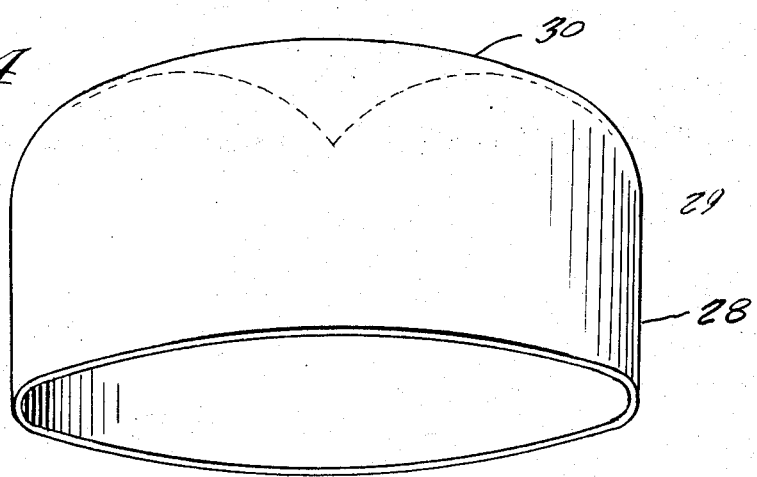
FIG. 4 is a perspective view of a sheet metal cap.

Referring now to the drawing in detail, and more particularly at this time to FIG. 1 thereof, the reference numeral 10 represents an anti-pollution apparatus according to the present invention wherein there is a vertical duct 11 having a lower end thereof placable over an upper end of a chimney or smoke stack 12. A water tank 13 has a central opening 14 for receiving the duct 11 therethrough; the securement in the opening being made water tight. The upper edge 15 of the tank 13 are inwardly rolled as shown.

A flange 16 formed around the duct 11 supports a filter assembly 17 consisting of a bottom vessel 18 with a bottom wall 19 perforated with openings 20. The side wall 21 of the vessel 18 supports a cylindrical unit 22 consisting of an inner cylinder 23 that fits around the duct 11, an outer cylinder 24 that fits adjacent the inner side of the vessel side wall 21; there being a series of horizontal, spaced apart screens or perforated circular plates 25 supported between the inner and outer cylinders 23 and 24. The plates 25 have perforated openings 26 therethrough. Lumps of charcoal 27 are placed upon the various screens or plates 25. A sheet metal cap 28 is fitted over the filter unit 22 so to enclose the top thereof. The cap includes a cylindrical side wall 29 that fits around the outer side of the outer cylinder 24, and a top wall 30 which at its center is downwardly conical so to be directed toward the upper end of the duct 11, where the upper edge of the duct is outwardly rolled as shown at 31.

Pipes 32 and 33 communicate with the bottom of tank 13 so to allow drainage of water 34 therefrom.

A series of water spray jets 35 extend from an outside water supply source into the interior of the filter unit 22 so to spray water over the top of the uppermost plate 25, as shown.

Figure 5:
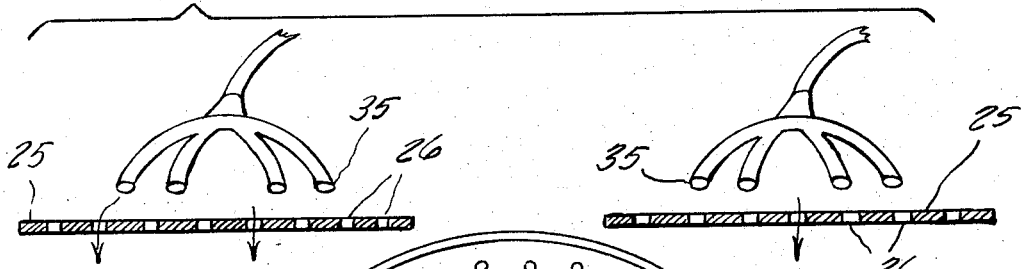
FIG. 5 is a side view of a water spray system.
Figure 6:
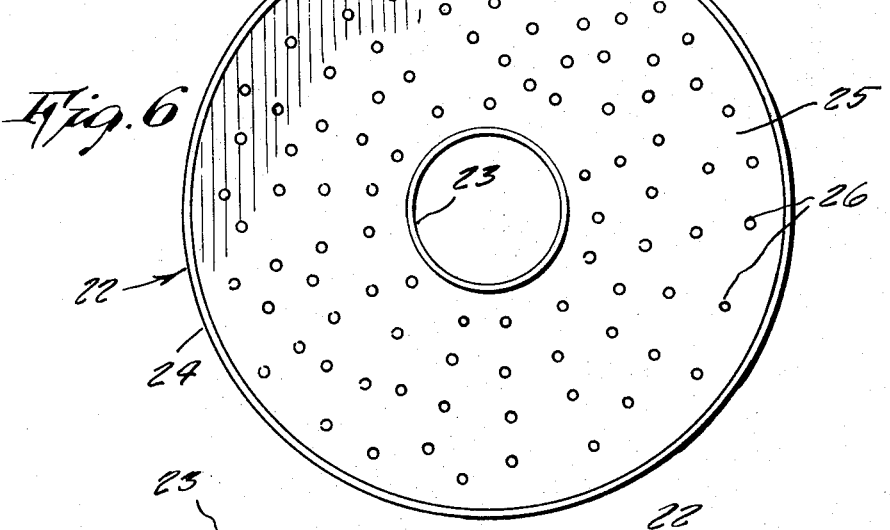
FIG. 6 is a plan view of a filter unit.
Figure 7:
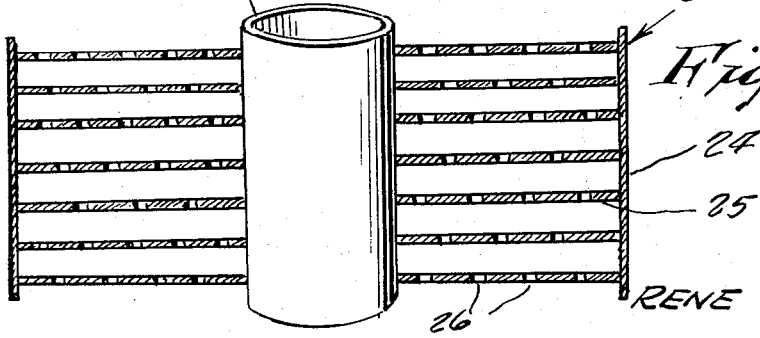
FIG. 7 is a side cross sectional view thereof.

It is to be noted, as illustrated in FIG. 5, that the water spray jets 35 are arranged in clusters, each cluster being branched to include several individual nozzles whereby the water spray can be distributed more extensively so to thoroughly pass through all minute areas of the space through which the smoke moves, thereby assuring to wash down such smoke particles as are carried into the filter unit 22.

It is to be further noted that charcoal is employed instead of carbon particles, because charcoal will not dilute into the water, and is considerably less expensive and therefore more practical.

In use, it is now evident that smoke moving up the smoke stack or chimney 12, enters the duct 11, then upwardly into the upper end of the filter unit 22 where the water sprays wash the smoke. The smoke is then forced downwardly, by blower power remotely placed, the smoke moving past the charcoal, the smoke filtering through all the plates 25 until it moves out the bottom perforations of the filter unit. It then enters the water 34 at the bottom of the tank, passing as small bubbles therethrough so to be fully washes, so that upon leaving the water, the smoke is changed into clean air which then travels up through passage 36 around the outside of the filter unit 22. It then moves up under conical canopy 37 and up through a duct 38 into the atmosphere.

Thus an individual apparatus 10 is provided for antipollution of smoke into the air.

In FIGS. 2 and 3 a modified design of apparatus 40 is shown and which may be constructed on small scale for purifying a room of a house. Alternately it may be made very large so to accomodate a large smokestack having a very large capacity of smoke movement.

The apparatus 40 consists of a series of individual units 41 formed together so that smoke moves in sequence from one unit 41 to another on its way out to the atmosphere.

Each unit is composed of silter units 42 with tiers of perforated plates 43 spaced above each other for supporting the carbon lumps. The lower end of the units connect with a water tank 44; the tanks being separated by partitions 45 from each other. Thus smoke travels a tortuous path through the units.

The water in both forms of the invention collect the smoke impurities. The water occassionally is drained and replaced; the impurities draining into a sewer.

While various changes may be made in the detail construction, it is understood that such changes will be within the scope and spirit of the present invention.

I claim:

1. An anti-pollution apparatus comprising a duct having one end adapted to be placed on the upper end of a chimney or smoke-stack from which smoke is forced by a blower, said duct supporting a filter unit, said filter unit comprising an inner cylindrical wall in concentric and contacting relationship with said duct and an outer cylindrical wall, a series of horizontal, spaced apart, peforated annular plates extending between said walls, charcoal lumps supported on said peforated plates, cap means over the upper end of said filter unit and enclosing in contacting relationship the outer cylindrical wall thereof for directing smoke from said duct into said filter unit, a series of liquid spray jets positioned above the topmost peforated plate in said unit, a liquid tank containing a quantity of liquid positioned below said filter unit and submerging the lower portions of said walls of said filter unit whereby direct flow communication between said filter unit and said quantity of liquid is provided, said tank having pipe connections for drainage, said filter unit further having a perforated bottom wall positioned in the quantity of liquid.

2. The combination as set forth in claim 1, wherein said liquid spray jets comprise a series of clusters, each of said clusters comprising branched ducts provided with a plurality nozzles.

3. The combination as set forth in claim 2 wherein said cap comprises a sheet metal cover of an inverted cup like shape and which includes a circular top wall which at its center is downwardly rounded toward a pointed central apex so as to evenly divert smoke from said chimney duct into all sideward directions.

* * * * *